United States Patent [19]

Witkover

[11] Patent Number: 4,633,523

[45] Date of Patent: Dec. 30, 1986

[54] OPTICAL ANALOG DATA LINK WITH SIMPLE SELF-TEST FEATURE

[75] Inventor: Richard L. Witkover, Commack, N.Y.

[73] Assignee: The United States of America as represented by the United States Department of Energy, Washington, D.C.

[21] Appl. No.: 575,732

[22] Filed: Feb. 1, 1984

[51] Int. Cl.$^4$ ............................................. H04B 9/00
[52] U.S. Cl. .................................. 455/608; 375/23; 375/89; 455/615; 455/617
[58] Field of Search .................. 370/10; 455/608, 617, 455/615; 375/10, 23, 89

[56] References Cited

U.S. PATENT DOCUMENTS

| | | | |
|---|---|---|---|
| 3,927,316 | 12/1975 | Citta | 455/608 |
| 4,151,407 | 4/1979 | McBride et al. | 455/608 |
| 4,388,732 | 6/1983 | Hansel | 455/608 |
| 4,399,564 | 8/1983 | Cowen | 455/608 |
| 4,502,937 | 3/1985 | Yagi | 455/613 |

OTHER PUBLICATIONS

Grimes–A High Resolution Analog Fiber Optics–Proc. of SPIE, vol. 95, Modern Util. of Ir. Tech II, 1976, pp. 178–187.
Brown et al–"System and Circuit"–*IEEE Trans. on Comm.*, vol. COM 26, No. 7, Jul. 1978, pp. 976–982.
"Fiberoptic Transmitter"–*Published by Burr Brown Res. Corp.*, Tuscon, Ariz., Jun. 1982.
Mims–"V/F Converters"–*Popular Electronics*–Oct. 1979, pp. 97–99.
Mims–"F/V Converters"–*Popular Electronics*–Nov. 1979, pp. 93, 94, 96.

*Primary Examiner*—Joseph A. Orsino, Jr.
*Attorney, Agent, or Firm*—Vale P. Myles; Paul A. Gottlieb; Judson R. Hightower

[57] ABSTRACT

A communications circuit for optically transmitting analog data signals free of excessive ripple, while having rapid response time. The invention is further characterized by being adapted to provide an immediate indication of the failure of the optical transmission link of the circuit. Commercially available voltage to frequency converter chips are used in conjunction with suitable wiring arrays and in combination with readily available indicator means for constructing the communication circuit of the invention. A V/F converter in the communications circuit is coupled to an offset adjustment means to cause the converter to continuously produce a string of output voltage pulses having a frequency of about 1 Khz responsive to the input analog signal to the converter being zero. The continuous presence of the 1 Khz frequency on the optical transmission link is monitored at the receiving end of the communication circuit and the indicator means is connected to immediately provide an easily detected indication of a failure of the optical transmission link to transmit the 1 Khz frequency pulses.

2 Claims, 5 Drawing Figures

PINS 2,3,6,8 & 9 NC

PINS 2,3,6,8 & 9 N.C.

OPTICAL ANALOG DATA LINK WITH SIMPLE SELF-TEST FEATURE

The U.S. Government has rights in this invention pursuant to Contract Number DE-AC02-76CH00016, between the U.S. Department of Energy and Associated Universities Inc.

BACKGROUND OF THE INVENTION

This invention relates to communication circuits that include an optical transmission link and that are operable to transmit analog data; more particularly, the invention relates to such a circuit that includes signal transmission means which are capable of transmitting an analog data signal free of excessive ripple distortion. Also, an analog data communication circuit constructed according to the invention is capable of affording an indication of a failure in its optical transmission link.

A well known method for optically transmitting analog data is to encode an analog signal to digital form in order to avoid the amplitude distortions that can influence optical signals due to the many variable factors frequently encountered in optical data transmission. Typically, the analog data signal is converted to a string of voltage pulses the frequency of which is determined as a function of the input signal voltage amplitude. In the last several years voltage-to-frequency (V/F) converters that are stable in operation and have good resolution have been readily available commercially at relatively low cost. Consequently, the use of such converters in analog data transmission circuits has become a favored means for converting an analog signal to a desired string of voltage pulses. In such circuits, the variable frequency voltage pulse string is then converted to an optical signal which is transmitted through a fiber optic light guide to a suitable photo-detector, which converts the signal back to another string of voltage pulses. In order to reconstruct the signal a frequency-to-voltage (F/V) converter, which is typically a commercially available V/F converter used in inverse configuration, is typically used. The F/V converter produces an output voltage that varies in amplitude as a function of the frequency of the input signal.

A recognized disadvantage of this well-known method for optically transmitting analog data signals is that the output ripple of such a communication circuit is inversely proportional to the input frequency. Accordingly, it is normally found to be necessary to integrate the pulses over a long period of time in order to achieve an acceptable level of output ripple. The use of such long integrator time constants makes this a very slow response time technique. In order to improve the response time, a variety of complex circuits have been developed for use in place of simple integrator circuits, but it remains very desirable to afford a more efficient means for extending the useful range of operation of such well known optical data communication circuits by making them relatively free of excessive output ripple, particularly at the low frequency ranges where the output ripple distortion is normally the most severe.

OBJECTS OF THE INVENTION

A major object of the invention is to provide a communication circuit for optically transmitting analog data that is free of excessive output ripple distortion.

Another object of the invention is to provide a communication circuit that is operable to optically transmit analog data that is free of excessive ripple, while providing a relatively rapid response time, without requiring the use of complex circuitry or long integrator time constants to reduce the output ripple.

Yet another object of the invention is to provide an optical analog data communication circuit with an indicator that affords immediate self diagnosis of any failure of the optical transmission link.

A further object of the invention is to provide a communication circuit for optically transmitting a plurality of different analog data signals over different channels, in combination with relatively simple indicator means for immediately indicating the failure of any one or more of the optical links in the respective channels.

Still further objects and advantages of the invention will become apparent to those skilled in the art from the description of it presented herein considered in conjunction with the accompanying drawings.

SUMMARY OF THE INVENTION

In one preferred form of the invention a communication circuit for optically transmitting analog data signals is made by operably connecting in series a V/F converter, an optical transmitter, a fiber optic transmission link, an optical receiver, and a F/V converter that is adapted to feed output to an indicator circuit that is provided in one preferred form of the invention, and to other receiving devices connected to the transmission circuit. According to the invention the foregoing general circuitry is characterized by including offset adjustment means that are operable to cause the V/F converter and optical transmitter to continuously produce a string of voltage pulses having a frequency of about 1 KHz, responsive to a zero voltage input signal at the input terminal of the V/F converter. The optical receiver in the communications circuit is biased to provide a zero voltage output responsive the input of about 1 KHz; thus, the output of the F/V converter in the communication circuit is made directly proportional to the amplitude variations of the analog data signal originally input to the circuit. Since output ripple in such a communication circuit is inversely proportional to the input frequency such shifting of the upper and lower limits of the input voltage range by about 1 KHz greatly reduces the circuit filtering requirements necessary to provide an output analog data signal that is free of excessive ripple.

An important further feature of the invention is that the output of the F/V converter can be readily connected to a simple indicator, such as a light emitting diode that can be mounted on a readily accessible control panel or other suitable mounting means. In such an embodiment, with the output F/V converter operably connected to an indicator, if the optical transmission suffers a failure, or if other failure occurs in the communication circuit causing a loss of signal output at the V/F converter, a negative voltage appears at the optical receiver output, due to its biasing, and that negative voltage causes the indicator to immediately provide a suitable indication of such failure. Accordingly, when the invention is used in a multi-channel optical data communications system, the provision of such an indicator for each of the respective channels operates to immediately afford an indication of the failure of any one or more of the channels thereby frequently enabling an operator to avoid very costly operating time delays.

BRIEF DESCRIPTION OF THE DRAWINGS

FIG. 2b is a schematic circuit diagram of the operating components in the V/F converter chip used in the circuit of FIG. 2a.

FIG. 3b is a schematic circuit diagram showing the connections of the F/V converter illustrated in FIG. 3a.

DESCRIPTION OF THE PREFERRED EMBODIMENTS

Figure 1:
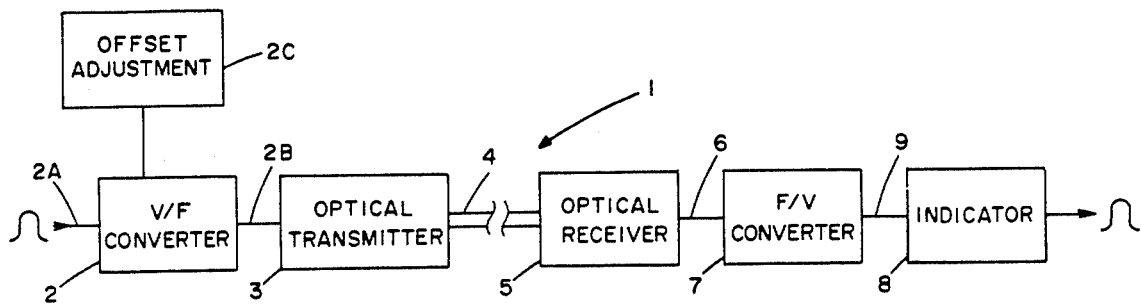
FIG. 1 is a block diagram of a communication circuit for optically transmitting analog data that is free of excessive ripple, and for indicating a failure of the optical transmission link, according to the present invention.

As is mentioned above, it is well known to optically transmit analog data by a method that requires utilization of a communication circuit including a V/F converter to modulate variations in voltage amplitude of an input signal and provide a frequency modulated string of output pulses that are transmitted over an optical circuit link to a demodulating receiver and an F/V converter, which operates to restore the signal to an amplitude modulated voltage that is proportional to the analog input signal. FIG. 1 is a block diagram that illustrates such a circuit that includes improvements according to the present invention, to achieve the objective stated above. In the preferred embodiment of the invention illustrated generally in FIG. 1, there is shown a communication circuit 1 that is operable to optically transmit analog data that is free of excessive ripple. The circuit 1 includes a V/F converter 2 that is operatively connected to receive an analog voltage signal that may be introduced from any suitable source to the input line 2A. The V/F converter is further operable to produce a string of voltage pulses that are made to vary in frequency as a function of changes in the amplitude of the analog signal input on the line 2A. The output of converter 2 is fed by line 2B to an optical transmitter 3 that is connected to appropriately receive the string of voltage pulses produced by the converter and to, in turn produce flashes of light at a frequency that varies in proportion to variations in the frequency of the voltage pulses recieved on the input line 2B. An optical transmission link 4, which may be any suitable conventional fiber optic cable, is connected to transmit the flashes of light generated by the transmitter 3 to carry those flashing signals to an optical receiver 5. The receiver circuit 5 is appropriately connected to receive the flashes of light input to it from the transmission link 4 and to produce a chain of voltage pulses at its output, the frequency of which varies in proportion to variations in the frequency of the flashes of light received from the cable 4. The output voltage pulses of the receiver 5 are carried over a line 6 to a F/V converter 7 that is operatively connected to receive those voltage pulses and to produce an output voltage that varies in amplitude from a minimum voltage of predetermined magnitude to a higher voltage that varies in amplitude as a function of variations in the frequency of the chain of voltage pulses received over line 6. As generaly described thus far, except for the biasing of the F/V converter, the communication circuit of FIG. 1 is similar to the well-known type of optical data transmission circuit mentioned above, which has found considerable use in applications requiring the transmission of analog data.

According to the invention, the communications circuit of FIG. 1 is characterized by including an offset adjustment means 2C, for the V/F converter 2, which is adjusted to cause the converter 2 to continuously produce an output string of pulses of predetermined frequency. In the preferred form of the invention shown in FIG. 1 the offset adjustment 2C comprises an offset voltage means that is operatively connected as shown to the converter 2 and that is set to be effective to cause the minimum frequency of the string of voltage pulses produced by the F/V converter to be at least 1 Khz, responsive to the amplitude of the analog voltage signal on input line 2A being zero. With the offset adjustment 2C set in this manner it can be seen that the output of F/V converter 7 is a voltage that varies in amplitude from a minimum voltage which is proportional to the minimum frequency of at least about 1 khz to higher voltages that vary in amplitude as a function of variations in the frequency of the chain of voltage pulses produced by the F/V converter 2. Thus, the output voltage of the F/V converter 7 is made to vary in proportion to variations in the analog voltage signal on input line 2A, while being free of excessive ripple, even when the variations in amplitude of the analog voltage signal on line 2A are very small.

The communication circuit 1 is further characterized according to the invention by having connected in combination with the basic circuit described thus far an indicator 8 that is operatively connected by the line 9 to the output of F/V converter 7, and is effective to provide a predetermined indication of a transmission problem, responsive to the F/V converter failing to produce an output voltage at least equal in amplitude to the minimum input signal voltage (on line 2A) corresponding to the input on line 6 of said frequency of at least about 1 Khz. In applying the invention, the indicator 8 may be a suitable conventional light emitting diode that is appropriately mounted at a readily visible location on a conventional instrument panel associated with the communication circuit 1.

Figure 2A:
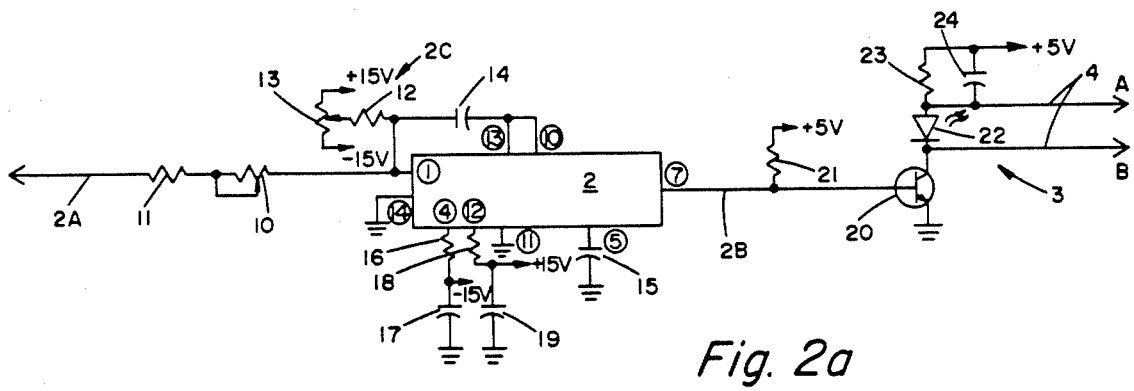
FIG. 2a is a schematic circuit diagram of a preferred embodiment of the V/F converter and optical transmitter portions of the circuit shown in FIG. 1.
Figure 2B:
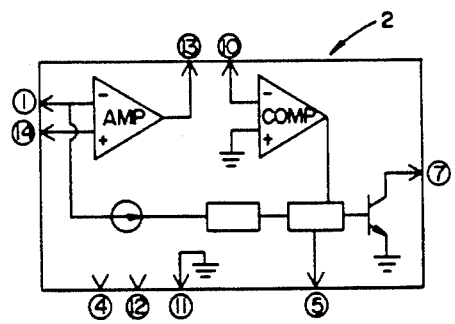

A more detailed description of the circuitry used in the preferred embodiment of the communication circuit 1 of the invention is shown in the remaining Figures of the drawing. Thus, FIG. 2a shows a preferred V/F converter 2 and its associated wiring circuit array, in conjunction with the offset adjustment 2C and the optical transmitter circuit 3. FIG. 2b of the drawing shows a connection diagram for the terminals of the V/F converter 2 used in this preferred embodiment of the invention. Although it will be recognized by those skilled in the art that a variety of different commercially available V/F converter chips can be used with suitable different associated wiring arrays, the V/F converter chip used in this preferred embodiment is a Burr-Brown Research Corporation chip bearing the identification VFC32. The numbered terminals on the converter are shown encircled on the drawing, and are set off in parenthesis herein. Terminal (1) of the converter 2 connects the inverting input of its input amplifier (see FIG. 2b) through coupling potentiometer 10 and resistor 11 to the analog data signal input line 2A. Suitable values for all of the wiring components for the preferred embodiment described herein are shown in Table 1, below.

Terminal (1) of converter 2 is also connected, as shown, through a resistor 12 and a sliding tap to the resistor 13 of a suitable dual-ended conventional source of power, which in this embodiment is set to supply a positive 15 volts to one terminal of the resistor 13 and a negative 15 volts to its other end terminal.

Terminals (10) and (13) of the V/F converter 2 are connected in common, as shown, and are coupled through capacitor 14 to the offset adjustment means 2C. The one shot switch of the converter 2 is connected via terminal (5) through capacitor 15 to ground and is also coupled internally as shown in FIG. 2b through a transistor to the converter output terminal (7).

As explained above, according to the present invention, the offset voltage means 2C is adjusted while an analog data signal is being input over the line 2A into terminal (1) of converter 2, in order to shift the frequency of the string of voltage pulses output at the converter terminal (7) in a manner such that, when the input signal on line 2A is zero, the frequency of the string of voltage pulses at terminal (7) of is at least about 1 Khz. Such an adjustment serves to also shift upward the upper end of the band of frequencies produced by the converter 2 responsive to variations in the amplitude of the analog data signal applied to the line 2A. It should be understood that the desired objective of producing a ripple free transmission of analog data over the communication circuit of the invention can also be achieved, and improved, if the offset voltage means 2C is adjusted further to shift the output frequency of the string of voltage pulses at converter terminal (7) so that the output frequency at that terminal, responsive to a zero input voltage on the line 2A, is significantly higher than the about 1 Khz output used in the preferred embodiment of the invention described here.

Before proceeding to a description of the optical transmitter circuit 3, it should be noted that the wiring array for the V/F converter 2 is completed by connecting its terminals (11) and (14) to ground, connecting the terminal (4) through resistor 16 to a suitable, conventional source of minus 15 volts, which is filtered by grounded capacitor 17. Terminal (12) is connected through resistor 18 to a suitable conventional source of plus 15 volts that is filtered through grounded capacitor 19. Output terminal (7) is connected by line 2B to the optical transmitter circuit 3.

Although a variety of different optical transmitter arrangements may be used to practice the invention, in the preferred embodiment of the invention the transmitter 3 includes transistor 20 which has its base connected to the line 2B, and through resistor 21, to a suitable, conventional source of plus 5 volts. The emitter of transistor 20 is grounded while its collector is connected in series with light emitting diode 22, which produces flashes of light each time the transistor 20 is triggered to complete the circuit through it from ground to the suitable conventional source of plus 5 volts which is connected to one of the common junctions of parallel resistor 23 and capacitor 24. The other common junction of paralleled resistor 23 and capacitor 24 is connected to LED 22 and output terminal A, of optical link 4. Light flashes produced by LED 22 are transmitted over a suitable, conventional fiber optic cable 4, as explained above with reference to the communication circuit shown in FIG. 1, to the optical receiver 5, which will now be discussed in detail.

Figure 3A:
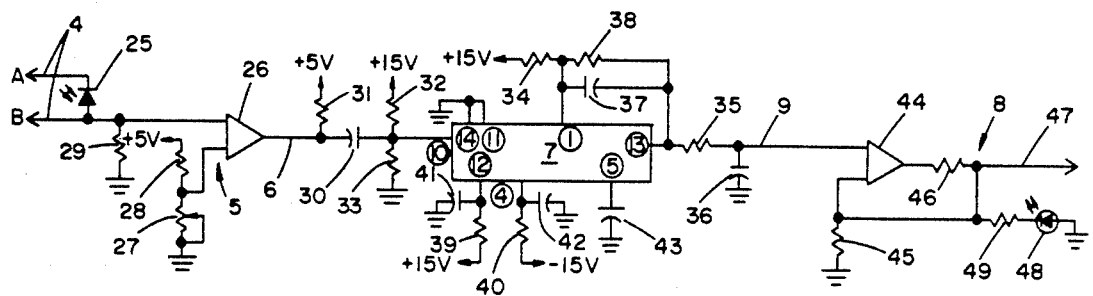
FIG. 3a is a schematic circuit diagram of the optical receiver, the F/V converter and the indicator circuit used in making one preferred embodiment of those respective components of the circuit of FIG. 1.
Figure 3B:
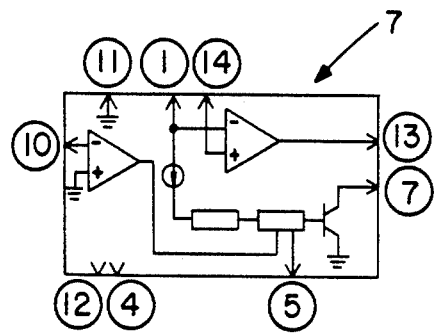

As seen in FIG. 3a, the optical receiver 5 in this embodiment of the invention includes a photo detector in the form of a light sensitive diode 25 that is connected to receive flashes of light transmitted over the fiber optic cable 4 and that is operative to produce pulses of voltage at the positive terminal of comparator 26. The reference voltage on the other terminal of comparator 26 is suitably adjusted by setting grounded potentiometer 27 of the voltage divider including resistor 28 and a suitable, conventional source of plus 5 volts. Resistor 29 is connected as shown between comparator 26 and ground. The output of optical receiver 5 is connected over line 6 through a coupling capacitor 30 to terminal (10) of F/V converter 7, which is the same type of VFC-32 converter described above. However, in this circuit the converter is provided with an appropriate wiring array to make it operate in the desired F/V converting mode. Of course, the internal components of the converter 7 are the same as those shown in FIG. 2b, but the drawing of FIG. 3a showing those components again is included to facilitate convenience reference with respect to the application of the converter in the F/V converting mode.

Resistor 31 is connected between the line 6 and a suitable conventional source of plus 5 volts, while the inverting terminal (10) of the comparator in converter 7 is connected to the junction of voltage dividing resistors 32 and 33, as shown. The other end of the resistor 32 is connected to a suitable conventional source of plus 15 volts and the other end of resistor 33 is grounded. Input amplifier terminal (1) of the converter 7 is connected through resistor 34 to a suitable source of plus 15 volts, while the other terminal of the chip amplifier is grounded at terminal (14). Terminal (11) of converter 7 is also grounded. The amplifier output in converter 7 is connected to terminal (13) and through resistor 35 to the output line 9. Filter capicitor 36 is connected between line 9 and ground. A feedback circuit for the amplifier is connected between converter output terminal (13) and its input terminal (1) and includes paralleled capacitor 37 and resistor 38, which are connected, as shown, to a source of plus 15 volts. Resistor 39 also couples a source of plus 15 volts to terminal (12) and a source of minus 15 volts is connected through resistor 40 to terminal (4) of the converter 7. Grounded filtering capacitor 41 is connected to terminal 12 and capacitor 42 is connected between ground and terminal (4). The one shot switch of converter 7 is connected through terminal 5 to capacitor 43, the other side of which is grounded.

It is important to note that in the wiring array for F/V converter 7 the resistor 34 is made sufficiently large so that power fed from the plus 15 volt source connected to that resistor is effective to cause a negative voltage of about minus 1.5 volts output on the line 9 when no input voltage is received at terminal (10) from input line 6 connected to optical receiver 5. Accordingly, in the absence of a 1 Khz input string of voltage pulses being received on line 6 from the optical receiver 5, the F/V converter 7 will operate to immediately transmit a negative voltage of about 1.5 volts on to output line 9. This operating feature is applied, according to the invention by connecting output line 9 to indicator 8, which comprises an input amplifier 44 having its non-inverting terminal connected to the line 9 and its other terminal connected through resistor 45 to ground. The output of amplifier 44 is connected through resistor 46 to a suitable output circuit 47 that is adapted to transmit the desired analog data signal carried by communication circuit 1.

The important indicating feature of the present invention is provided, in this embodiment, by a light emitting diode, or other suitable indicator means, comprising the voltage switchable light emitting indicator 48, which is connected, as shown, through resistor 49 to output line 47 and to the negative terminal of amplifier 44. The LED 48 is operable to emit a light signal, responsive to the output voltage of the F/V converter 7 changing to a negative voltage responsive to loss of the at least about 1 Khz frequency string of voltage pulses on the input line 6 to F/V converter 7.

From the description of the invention presented thus far it will be apparent that a plurality of parallel communication circuits each similar to the communication circuit 1, can be used in combination with a suitable control panel of conventional construction on which each of a plurality of light emitting indicators, such as the light emitting diode 48 of indicator 8 in communication circuit 1, can be mounted in a position that will readily enable an operator to observe all of them simultaneously. With that combination the operator can immediately receive an indication of the failure of any one or more of the communication circuits to produce an output voltage, and take appropriate remedial action.

Although many different circuits and associated variations in wiring arrays may be used to practice various alternative embodiments of the invention, there is listed in Table I, below, the representative values of the components discussed above in describing the preferred embodiment of the invention illustrated herein. It will be understood that this listing is illustrative and is not intending to limit the scope of the invention.

Those skilled in the art will recognize various other alternative embodiments and modifications of the teaching of the invention can be made to produce other practical circuits without departing from the true spirit and scope of the invention. Accordingly, it is my intention to define the true limits of the invention in the following claims.

TABLE I

| Resistor No. | Rep. Size in ohms |
| --- | --- |
| 10 | 50K |
| 11 | 22K |
| 12 | 240K |
| 13 | 100K |
| 16 | 100 |
| 18 | 100 |
| 21 | 1K |
| 23 | 68 |
| 27 | 1K |
| 28 | 4.7K |
| 29 | 2.2K |
| 31 | 470 |
| 32 | 12K |
| 33 | 2.2K |
| 34 | 820K |
| 35 | 2.2K |
| 38 | 82K |
| 39 | 100 |
| 40 | 100 |
| 45 | 4.7K |
| 46 | 100K |
| 49 | 100 |

| Capacitor No. | Rep. Size |
| --- | --- |
| 14 | 4700 Picofarads (PF) |
| 15 | 3300 PF |
| 17 | 0.01 Microfarads (MF) |
| 19 | 0.01 $\mu$F |
| 24 | 0.22 $\mu$F |
| 30 | 0.01 $\mu$F |
| 36 | 1 $\mu$F |
| 37 | 4700 PF |
| 41 | 0.01 $\mu$F |
| 42 | 0.01 $\mu$F |
| 43 | 3300 PF |

| Component No. | Type | Mfg. No. |
| --- | --- | --- |
| 20 | Transistor (Q) | 2N2219 |
| 22 | Light Emit Diode (LED) | MF0E200 |
| 25 | Light Sensitive Diode | MFD200 |
| 26 | Amplifier | LM339 |
| 44 | Amplifier | LF347 |
| 48 | LED | MF0E200 |

I claim:

1. A communications circuit for optically transmitting analog data free of excessive ripple comprising a V/F converter having an input line for receiving an analog voltage signal from a source of voltage, said V/F converter having an output and being effective to produce a predetermined minimum carrier frequency at said output responsive to receipt of a zero voltage signal on said input line, an optical transmitter connected to receive voltage pulses from said output and operable to produce flashes of light at frequencies varying in proportion to variations in the frequency of said voltage pulses, an optical transmission link connected to transmit said flashes of light, an optical receiver connected to receive flashes of light from said transmission link and operable to produce a chain of voltage pulses the frequency of which varies in proportion to variations in the frequency of said received flashes of light, and a F/V converter, the foregoing components of said circuit all being operatively connected in a series circuit in the order set forth thereby to cause the V/F converter to be effective to receive from said source of voltage an analog voltage signal on said input line and to generate in addition to said predetermined minimum carrier frequency a high carrier frequency that corresponds to the frequency of said flashes of light, thereby to enable the optical transmission link to transmit analog data at said higher carrier frequency, and to enable the F/V converter to produce an output voltage having a minimum amplitude proportional to said predetermined minimum carrier frequency; said communications circuit being connected in combination with indicator means that are operatively connected to receive the output voltage from said F/V converter and that are effective to indicate the absence of said minimum amplitude of voltage in the output of said F/V converter, responsive to interruption of transmission of the carrier frequency over the optical transmission link.

2. An invention as defined in claim 1 wherein said indicator means is a light emitting diode having its positive terminal grounded and having its negative terminal connected to receive the output voltage of said F/V converter, thereby to cause said LED to emit light responsive to the output voltage of the F/V converter becoming negative.

* * * * *